United States Patent [19]

Rogers et al.

[11] Patent Number: 5,544,858
[45] Date of Patent: Aug. 13, 1996

[54] QUICK DISCONNECT FLUID COUPLING

[75] Inventors: Russell L. Rogers, Munith; William C. Marrison, Jackson, both of Mich.

[73] Assignee: Aeroquip Corporation, Maumee, Ohio

[21] Appl. No.: 507,123

[22] Filed: Jul. 26, 1995

[51] Int. Cl.[6] .................................................. F16L 37/28
[52] U.S. Cl. ....................................... 251/149.6; 285/321
[58] Field of Search ........................... 251/149.1, 149.6; 137/614, 613; 285/314, 321

[56] References Cited

U.S. PATENT DOCUMENTS

| | | | |
|---|---|---|---|
| 4,506,862 | 3/1985 | Spinosa et al. | 251/149.6 X |
| 4,672,998 | 6/1987 | Kozak, III | 137/614 X |
| 4,926,895 | 5/1990 | Gailey | 251/149.6 X |
| 5,056,756 | 10/1991 | Norkey et al. | 251/149.6 |

OTHER PUBLICATIONS

How A Task–Oriented, Problem–Solving Mentality Led Us To A New Generation In Animal Housing Technology . . . , Lab Products Inc. brochure, pp. 1–6, 1990.

Laboratory Animal Automatic Watering Equipment Manual, SE Lab Group brochure, pp. 1–24, 1994.

Lab Products, Inc. As Seen In AALAS Contemporary Topics, Lab Products Inc. brochure, pp. 1 and 2, undated.

*Primary Examiner*—Kevin Lee
*Attorney, Agent, or Firm*—Emch, Schaffer, Schaub & Porcello Co., L.P.A.

[57] ABSTRACT

A quick disconnect fluid coupling is disclosed. The fluid coupling may be used in, for example, animal watering systems. The fluid coupling includes first and second coupling members. One member has a movable valve which is moved from the valve seat by the stem of the other member upon coupling. A plurality of circumferentially spaced balls are urged inwardly by a constant force spring. The balls are received in a groove of the other member to secure one member to the other.

12 Claims, 7 Drawing Sheets

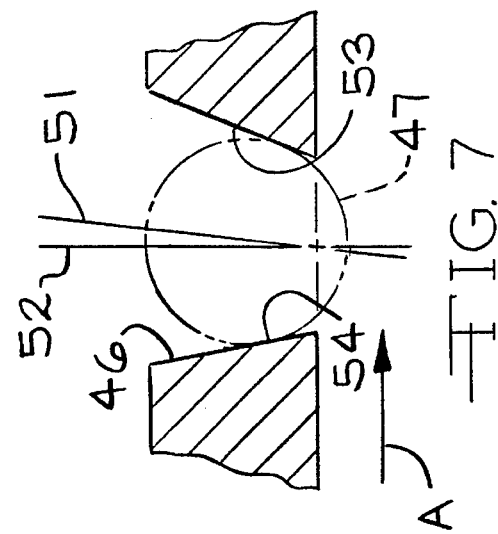
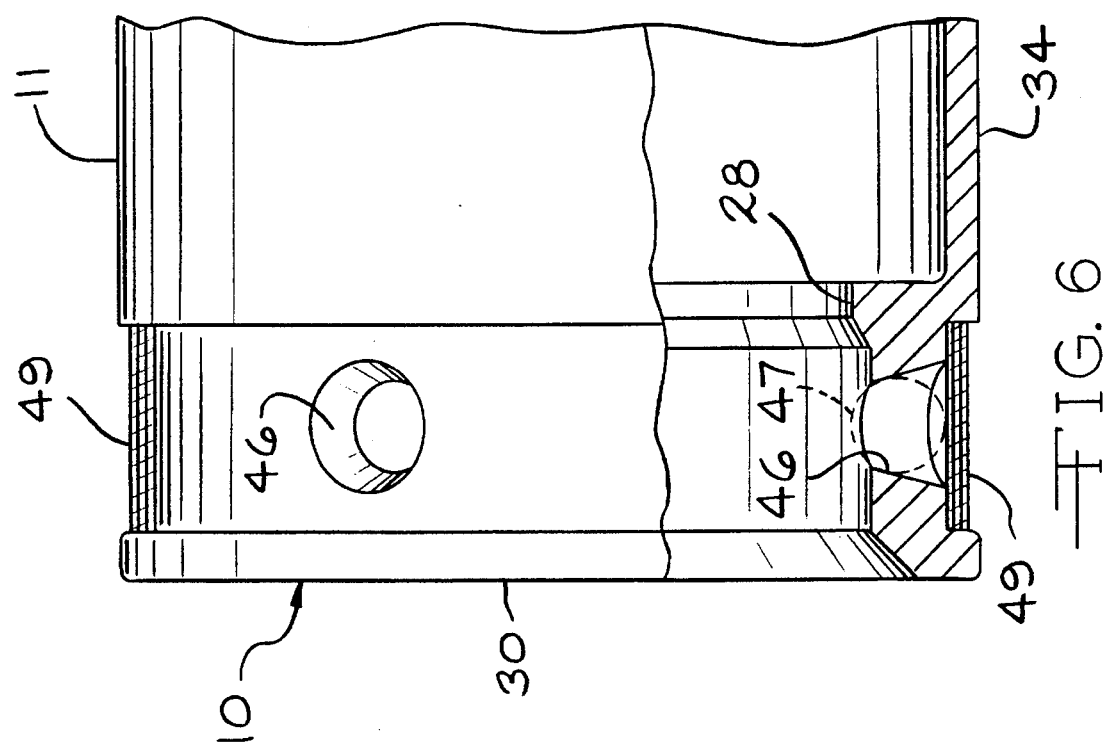

QUICK DISCONNECT FLUID COUPLING

DESCRIPTION

BACKGROUND OF THE INVENTION

The present invention is directed to a quick disconnect fluid coupling which is particularly adaptable for use in an animal watering system. Animals, such as rats or mice are often used in testing procedures. Individual animals or groups of animals are placed in cages and are observed over a period of time.

It is known in the prior art to provide a water manifold system adjacent the cages and to use a quick disconnect valve for connection of the water manifold system to the individual cages. One part of the fluid coupling is a part of the manifold system and the other part extends through the wall of the cage and is connected to the cage. It is also known in the prior art to provide a valve within the fluid coupling part connected to the water manifold system so that the valve is closed when the coupling is disconnected.

It is also known in the prior art to use an additional watering valve which is mounted on the coupling part connected to the cage. This animal watering valve includes a valve plunger which is pushed by the animal when the animal desires water. Movement of the plunger opens the auxiliary animal watering valve and water is dripped to the animal.

One problem known in prior art quick disconnect fluid couplings is that the coupling often disengages accidentally. This can occur when cages are added or removed. Often vibration of the cages as they are rolled in a wheeled bank of cages causes enough vibration to result in accidental disconnection.

When accidental disconnection occurs, the animals can become dehydrated or in the extreme die.

The primary object of the present invention is to provide an improved quick disconnect fluid coupling, which is adaptable for animal watering systems.

SUMMARY OF THE INVENTION

The present invention is directed to a quick disconnect fluid coupling which includes first and second coupling members. The first coupling member defines a central passageway and a valve member is positioned for movement within the central passageway. The second coupling member includes a stem for positioning within the central passageway of the first coupling member. The first coupling member defines a plurality of circumferentially spaced openings adjacent the central passageway and individual balls are positioned in each of the openings. A constant force spring is mounted on the first coupling member to urge the balls into a locking engagement with the second coupling member.

BRIEF DESCRIPTION OF THE DRAWINGS

FIG. 6 is an enlarged fragmentary view, partially in cross section and showing the constant force spring which urges a plurality of balls inwardly;

FIG. 7 is a further enlarged fragmentary cross-sectional view showing a preferred hole configuration for retaining a ball.

DESCRIPTION OF THE PREFERRED EMBODIMENT

Figure 1:
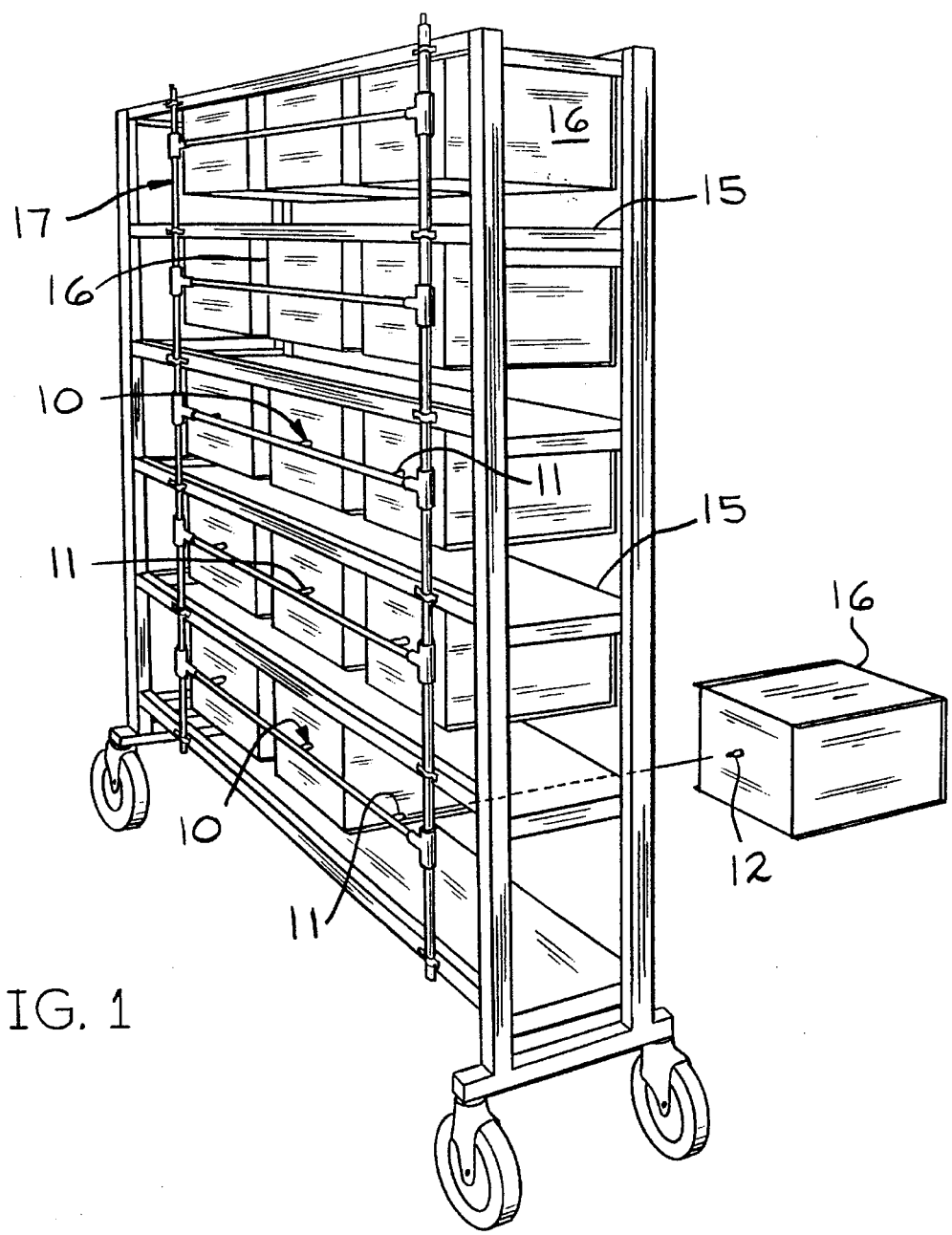
FIG. 1 is a perspective view of a animal watering system for use with laboratory animals and showing an individual cage moved away to disconnect the first and second coupling parts of a fluid coupling, according to the present invention.

A quick disconnect fluid coupling, according to the present invention, is indicated in the drawings by the reference number 10. The fluid coupling 10 includes a first coupling member 11 and a second coupling member 12. The coupling members 11 and 12 may be constructed of various materials, including metals such as brass and stainless steels and plastics. For use in animal watering systems, the preferred material is a stainless steel.

The fluid couplings 10 may be used for several applications, however a primary application is for use in animal watering systems. A typical animal watering system is illustrated in FIG. 1 and includes a wheeled support frame 14 having a series of shelves or support racks 15. Individual cages 16 are removably supported by the racks 15. The animals, such as laboratory mice or rats (not shown) are held by the cages 16. A water manifold assembly 17 is connected to a source of water (not shown). Individual first coupling members 11 are in fluid communication with the water manifold system 17 and are connectable with the second coupling member 12 which extend from the cages 16. Referring to FIGS. 2–5, in the FIG. 1 embodiment, a prior art animal watering valve 19 is threadably connected to the second coupling member 12 and includes an actuating plunger or rod 20. When the fluid coupling 10 is in the valve open position, shown in FIG. 5, water from the manifold system 17 is introduced into the animal watering valve 19 which is physically located within the cage 16. An animal, such as mouse or rat, moves the actuating plunger or rod 20 which opens the animal watering valve 19 sufficiently to drip water to the animal.

The second coupling member 12 includes an enlarged end 22 having internal threads 23. A stem 24 is integral with and extends outwardly from the enlarged end 22 of the second coupling member 12. The stem 24 of the second coupling member 12 defines a central fluid passageway 25 and also defines an annular or circular groove 26 on its exterior periphery.

Figure 3:
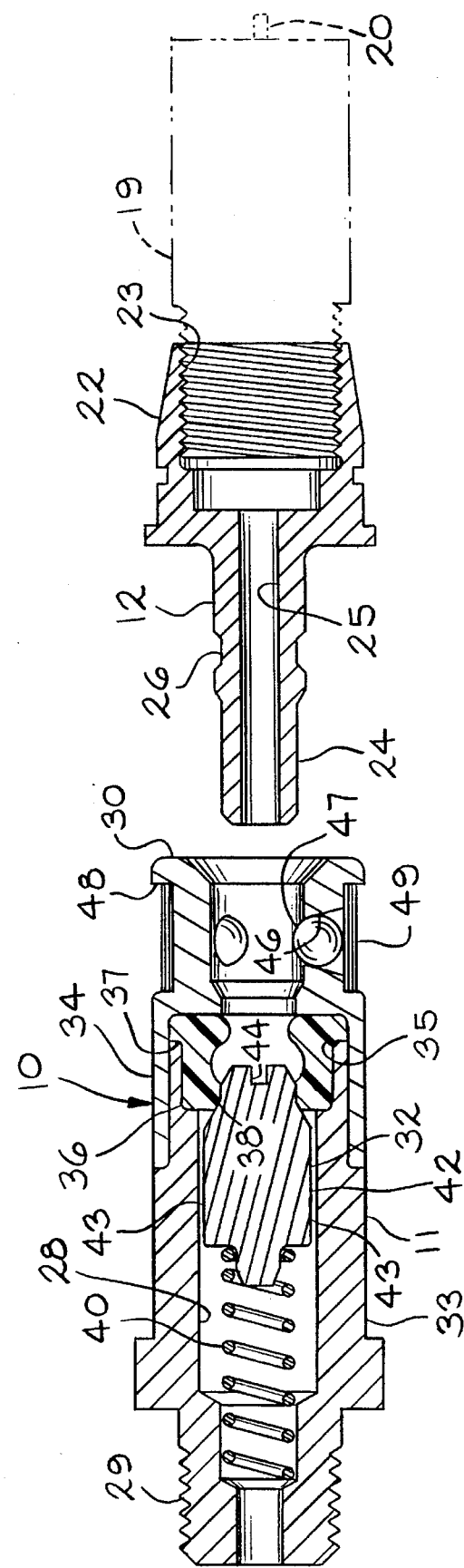
FIG. 3 is a sectional view of the fluid coupling shown in FIG. 2 in its disconnected mode and showing by dashed lines an auxiliary animal watering valve.

The first coupling member 11 of the fluid coupling 10 defines a central passageway 28. The first coupling member 11 includes a threaded end 29 and a coupling end 30. A valve member 32 is mounted for movement within the central passageway 28. The first coupling member 11 includes an adapter 33 and a body 34 mounted on the adapter 33. The adapter 33 and body 34 define the central passageway 28. As shown in FIG. 3, the adapter 33 includes a tubular end 35. A generally tubular elastomeric valve seal 36 is mounted in the body 34 and includes a circular shoulder 37. The valve seal 36 is constructed from known elastomers, such as EPR (ethylene propylene rubber), silicone rubbers or nitrile rubbers. The tubular end 35 of the adapter 33 engages the circular shoulder 37 of the valve seal 36 to hold the valve seal 36 in its desired position within the body 34. The valve seal 36 defines a generally circular sealing surface 38. Referring to FIG. 3, a coil spring 40 is positioned within the central passageway 28 of the first coupling member 11 and is in engagement with the valve member 32. The spring 40 urges the valve member 32 into a sealing relationship with the sealing surface 38 of the valve seal 36. When the fluid coupling 10 is in the disconnected position shown in FIG. 3, the valve member 32 tightly engages the valve seal 36 to stop the flow of fluid through the central passageway 28.

Figure 5:
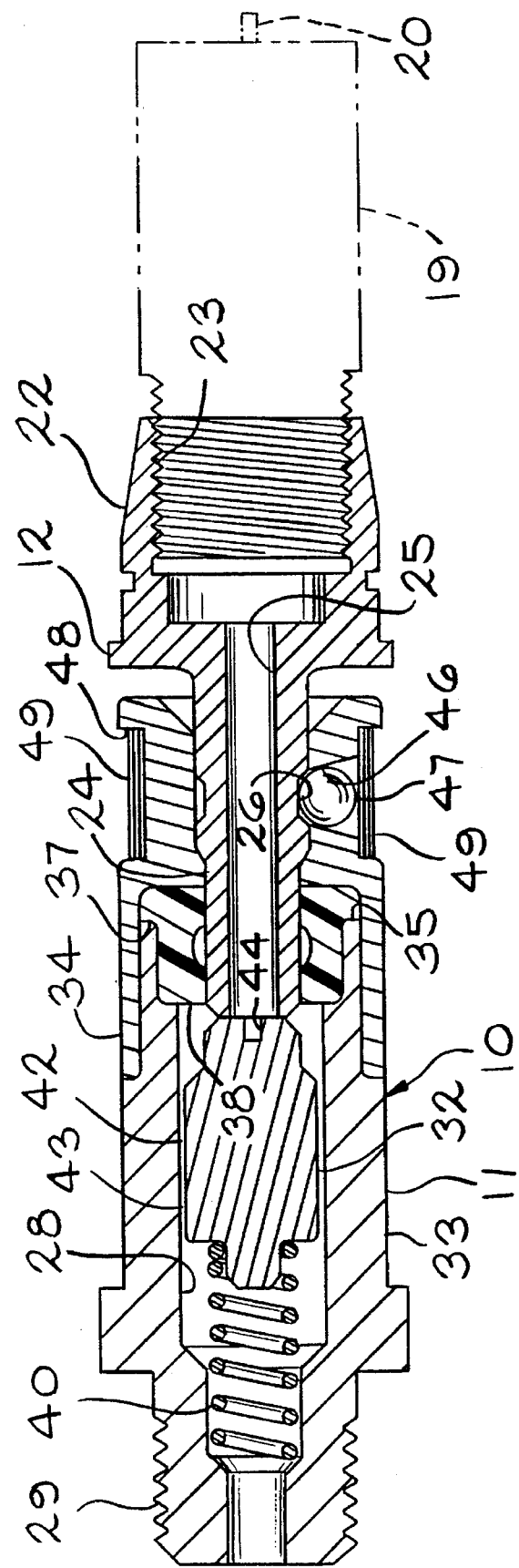
FIG. 5 is a view similar to FIG. 3 showing the fluid coupling valve after connection is completed.
Figure 8:
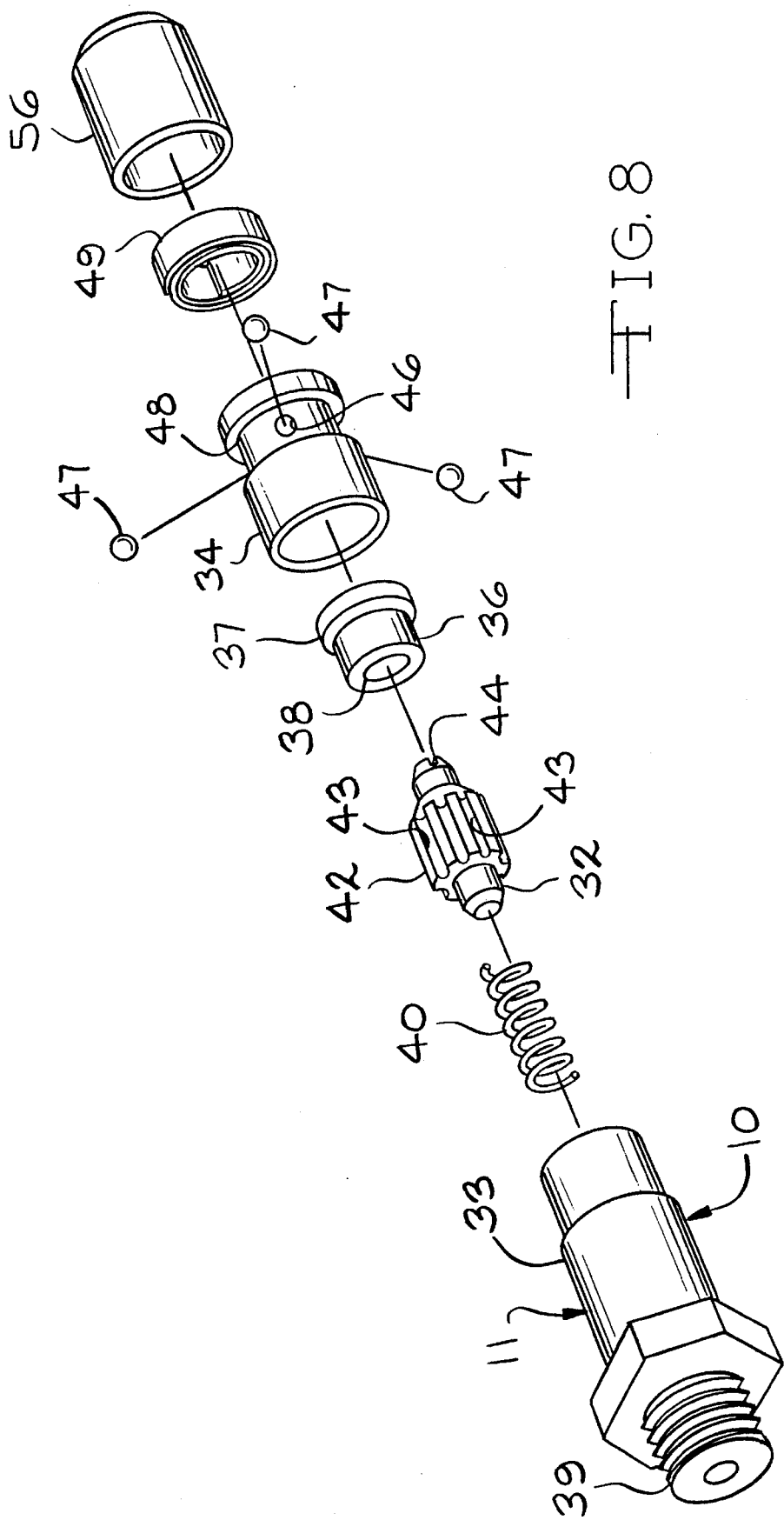
FIG. 8 is an exploded perspective view of the first coupling member of the fluid coupling, according to the present invention.

As best seen in FIG. 8, the valve member 32 has an outer periphery 42 which defines a plurality of longitudinally extending grooves or fluid passageways 43. When the fluid coupling 10 is in its connected position as shown in FIG. 5, the valve 32 is moved away from the valve seal 36 and fluid is free to move through the grooves or fluid passageways 43 into a passageway 44 defined in the end of the valve member 32 and through the fluid passageway 25 defined by the second coupling member 12.

The first coupling member 11 defines a plurality of circumferentially spaced openings 46 extending through the body 34. A ball 47 is movably positioned in each of the openings 46. The body 34 defines a circular groove 48. The plurality of circumferentially spaced openings 46 are in communication with the circular groove 48. An important feature of the present invention is that a constant force spring is mounted in the circular groove 48 in surrounding relationship to the body 34. The constant force spring 49 engages the balls 47 to urge the balls into a locking relationship with the second coupling member 12. Constant force springs are known in the art. The preferred constant force spring 49 illustrated is a coiled flat ribbon spring. However, other types of constant force springs are known. Constant force springs are sometimes referred to as motor springs or negator motor springs. The constant force spring 49 in the present embodiment is constructed of a stainless steel material.

In a preferred embodiment, when the fluid coupling 10 is used in an animal watering system, such as the illustrated FIG. 1 system, it is desirable that it be easy to connect the first and second coupling members 11 and 12 and more difficult to disconnect such members. To achieve this, the openings 46 are drilled on an axis which is a few degrees from perpendicular to the longitudinal centerline of the fluid coupling 10. FIG. 7 is illustrative of such a construction. The opening 46 is drilled along an axis 51 which is spaced three (3) degrees from a theoretical axis 52 which is perpendicular to the longitudinal centerline of the fluid coupling 10. In FIG. 7, an arrow indicated by the letter A, illustrates the direction of movement of the stem 24 when it is moving into the engagement position, as illustrated in FIG. 3. By drilling along the axis 51, the ramp surface 53 has a more gradual slope, relative to the ball 47 when connecting the members 11 and 12. Conversely, when disconnecting the ramp surface 54 provides a steeper slope relative to the ball 47 than the ramp surface 54. Therefore, it is easier to couple the members 11 and 12 of the fluid coupling 10 than to disconnect or uncouple the members 11 and 12. This aids in solving the prior art problem of accidentally disconnecting the couplings and removing the laboratory animals from their source of water.

Figure 2:
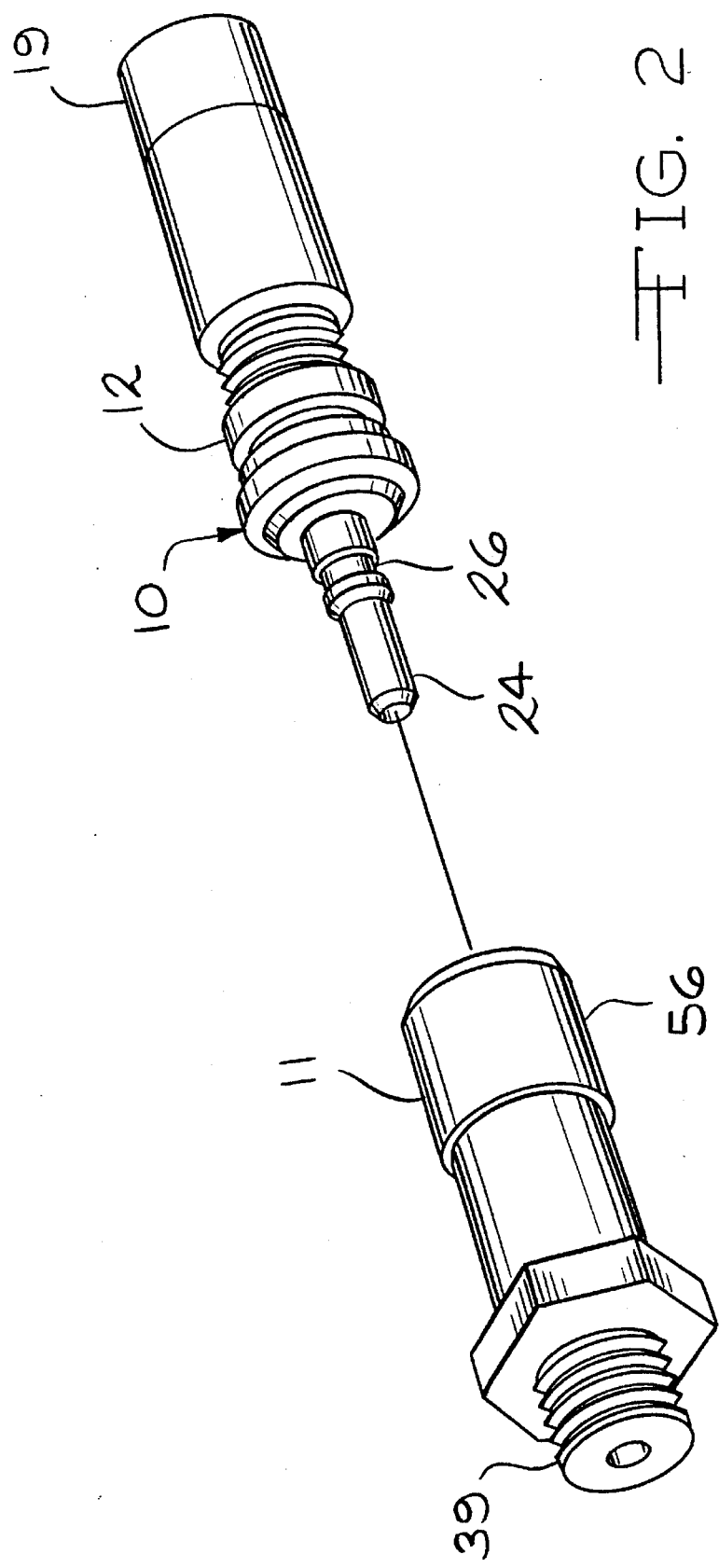
FIG. 2 is a perspective view showing a quick disconnect fluid coupling, according to the present invention.

Referring to FIGS. 2 and 8, a cover sleeve 56 may be positioned over the groove 48 and constant force spring 49, if desired.

Figure 4:
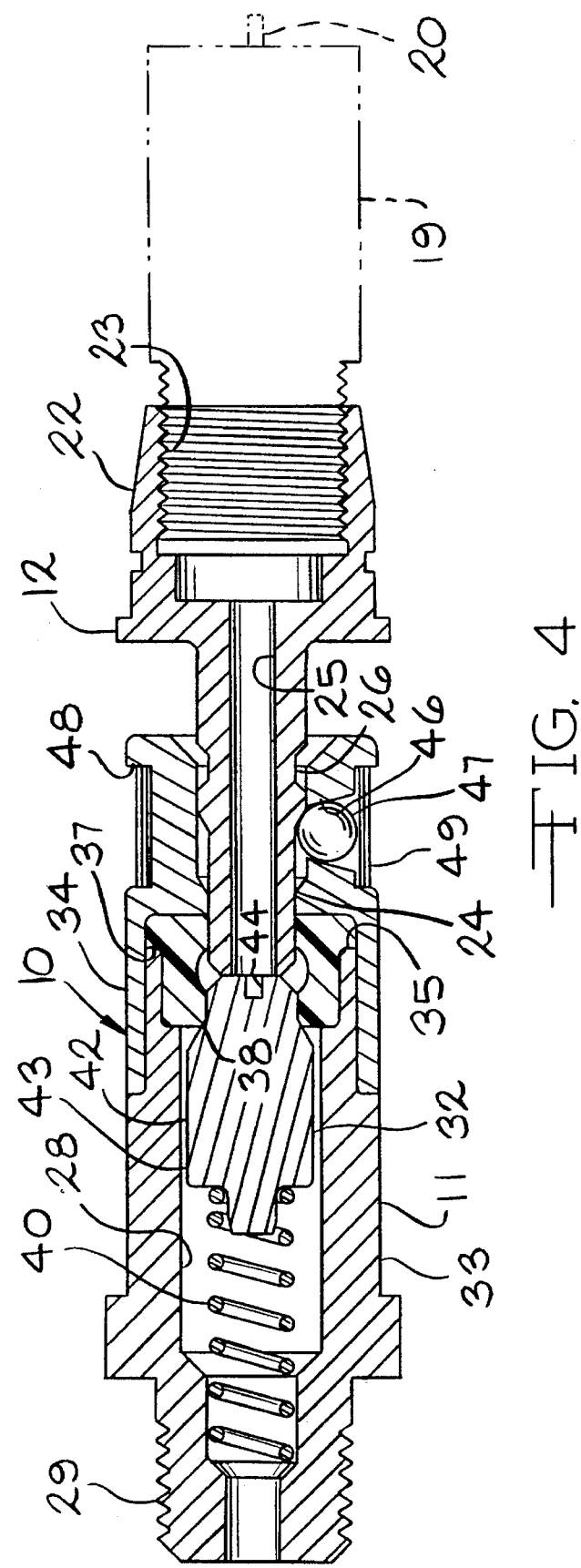
FIG. 4 is a view similar to FIG. 3 showing the fluid coupling valve as the stem of the second coupling member is inserted into the first coupling member.

The operation of the fluid coupling 10, according to the present invention is best illustrated in FIGS. 2–5. FIGS. 2 and 3 illustrate the first and second coupling members 11 and 12 in their disconnected position where the valve formed by the valve member 32 and valve seal 36 is closed, thereby preventing the flow of water. FIG. 4 illustrates the position of the components as the second coupling member 12 is engaged with the first coupling member 11. FIG. 5 illustrates the completely connected position where the balls 47 acting under the constant force spring 49 are snapped into position in the circular groove 26 of the stem 24. When in this position, the stem 24 has moved the valve member 32 out of position against the seal surface 38 of the valve seal 36 and fluid moves through the central passageway 28 and through the grooves or fluid passageways 43 of the valve member 32. It then flows through the passageway 44 in the end of valve member 32 into the fluid passageway 25 defined by the second coupling member 12. From there, with respect to the animal watering system, shown in FIG. 1, the fluid, such as water is introduced into the prior art animal watering valve 19 for supplying water to the laboratory animals.

Many revisions may be made to the above described preferred embodiment without departing from the present invention or from the scope of the following claims.

We claim:

1. A fluid coupling comprising a first coupling member and a second coupling member, said first coupling member defining a central passageway, a valve member positioned for movement within said central passageway, said second coupling member including a stem for positioning within said central passageway, said first coupling member defining a plurality of circumferentially spaced openings adjacent said central passageway, a ball positioned in each of said openings and a constant force spring mounted on said first coupling member, said constant force spring comprising a coiled flat ribbon spring, said constant force spring urging said balls into a locking relationship with said second coupling member.

2. A fluid coupling, according to claim 1, wherein said stem defines a circular groove for receiving said balls when in the locking relationship.

3. A fluid coupling, according to claim 1, including a valve seal having a sealing surface mounted adjacent one end of said valve member and a spring positioned within said first coupling member for urging said valve member against said sealing surface of said valve seal.

4. A fluid coupling, according to claim 3, wherein said valve member has an outer periphery, said outer periphery defining a plurality of longitudinally extending fluid passageways.

5. A fluid coupling, according to claim 1, wherein said first coupling member includes an adapter and a body mounted on said adapter, said adapter and said body defining said central passageway.

6. A fluid coupling, according to claim 5, wherein said adapter has a tubular end, a valve seal defining a sealing surface and a circular shoulder, said valve seal being mounted in said body, wherein said tubular end of said adapter engages said circular shoulder of said valve seal.

7. A fluid coupling, according to claim 6, including a spring positioned within said central passageway of said adapter in engagement with said valve member, said spring urging said valve member into engagement with said sealing surface of said valve seal.

8. A fluid coupling, according to claim 7, wherein said body defines a circular groove, said plurality of circumferentially spaced openings being in communication with said circular groove and said central passageway, said constant force spring mounted in said circular groove in surrounding relationship to said body, said constant force spring engaging said balls to urge said balls into a locking relationship with said second coupling member.

9. A fluid coupling, according to claim 8, wherein said second coupling member includes said stem and an end member having internal threads for mounting an auxiliary fluid valve.

10. A fluid coupling, according to claim 9, wherein said stem defines a fluid passageway in communication with said central passageway when said valve member is in an open position.

11. A fluid coupling, according to claim 10, wherein said stem defines a circumferential slot, said balls being received by said slot when the balls and said slot are aligned.

12. A fluid coupling comprising, a first coupling assembly having an adapter and a body, said adapter and said body defining a central opening extending therethrough, a valve member movably positioned within said central opening, said valve member having first and second ends, a spring positioned in said central opening adjacent said first end of said valve member, a valve seal positioned adjacent said second end of said valve member, said valve seal defining a central opening and a seal surface, said spring urging said valve member toward said seal surface, said fluid coupling including a second coupling assembly having an enlarged end member and a stem for insertion into said central opening defined by said first coupling assembly, said stem engaging said valve member to force said valve member away from said valve seal to form a fluid passageway, said first coupling assembly defining a plurality of spaced openings adjacent said central opening, said stem defining a circumferential slot, a plurality of locking balls positioned in respective ones of said spaced openings, and a constant force spring engaging said locking balls to urge said balls inwardly toward said circumferential slot, when said balls and said circumferential slot are aligned, said constant force spring comprising a coiled flat ribbon spring.

* * * * *